(12) United States Patent
Park (10) Patent No.: US 12,110,027 B2
(45) Date of Patent: Oct. 8, 2024

(54) METHOD AND APPARATUS FOR CONTROLLING LANE CHANGE

(71) Applicant: HYUNDAI MOBIS Co., Ltd., Seoul (KR)

(72) Inventor: Ge O Park, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 196 days.

(21) Appl. No.: 17/895,406

(22) Filed: Aug. 25, 2022

(65) Prior Publication Data

US 2023/0121690 A1 Apr. 20, 2023

(30) Foreign Application Priority Data

Oct. 19, 2021 (KR) ........................ 10-2021-0138933

(51) Int. Cl.
*B60W 30/18* (2012.01)
*B60W 30/165* (2020.01)
*B60W 50/14* (2020.01)

(52) U.S. Cl.
CPC .... *B60W 30/18163* (2013.01); *B60W 30/165* (2013.01); *B60W 50/14* (2013.01); *B60W 2530/10* (2013.01); *B60W 2552/10* (2020.02); *B60W 2554/4041* (2020.02); *B60W 2554/4042* (2020.02); *B60W 2554/4044* (2020.02); *B60W 2554/802* (2020.02)

(58) Field of Classification Search
CPC ......... B60W 30/18163; B60W 30/165; B60W 50/14; B60W 2530/10; B60W 2552/10; B60W 2554/4041; B60W 2554/4042; B60W 2554/4044; B60W 2554/802; B60W 30/0956; B60W 2554/80; B60W 2554/801; B60W 40/13; B60W 30/08; B60W 30/16; B60W 40/02; B60W 2050/143; B60W 2754/30; G06N 20/00
See application file for complete search history.

(56) References Cited

U.S. PATENT DOCUMENTS

| | | | | |
|---|---|---|---|---|
| 11,807,233 B1* | 11/2023 | Clawson | ............... | B60W 30/09 |
| 11,970,164 B1* | 4/2024 | Havlak | ............. | B60W 30/0953 |
| 2015/0158495 A1* | 6/2015 | Duncan | ................. | G08G 1/163 701/1 |
| 2020/0198633 A1* | 6/2020 | Fujimaki | ......... | B60W 30/18163 |
| 2020/0342760 A1* | 10/2020 | Vassilovski | ............ | G08G 1/161 |
| 2022/0219692 A1* | 7/2022 | Taniguchi | ............. | B60W 30/12 |
| 2023/0339487 A1* | 10/2023 | Okuda | ................. | B60W 10/08 |

\* cited by examiner

*Primary Examiner* — Ashley L Redhead, Jr.
(74) *Attorney, Agent, or Firm* — Morgan, Lewis & Bockius LLP (57) ABSTRACT

An apparatus for controlling lane change is disclosed. The apparatus may include a weight detection unit sensing weight of freight, a safety space setting unit receiving sensed weight and setting a safety space required for a vehicle to safely move to a target lane from a current lane based on the sensed weight, a sensor unit sensing whether an object exists in the safety space using at least one sensor, and a control unit controlling the vehicle to move to the target lane within a preset time when there is no sensed object. A method of controlling lane change is also disclosed.

10 Claims, 8 Drawing Sheets

METHOD AND APPARATUS FOR CONTROLLING LANE CHANGE

CROSS-REFERENCE TO RELATED APPLICATIONS

This application is based on, and claims priority from, Korean Patent Application Number 10-2021-0138933, filed on Oct. 19, 2021, the disclosure of which is incorporated by reference herein in its entirety.

TECHNICAL FIELD

The present disclosure relates to an apparatus and method for controlling lane change.

BACKGROUND

Description of this section only provides the background information of the present disclosure without configuring the related art.

As a portion of autonomous driving, there is a technology of controlling a vehicle to move to a desired lane (hereafter, a target lane) from the current lane without intervention of a driver.

This technology senses whether there is a surrounding object of a vehicle and determines whether there is a risk of a collision with the sensed surrounding object. The surrounding object may be a vehicle, road facilities, etc. that exist around a vehicle. When determining that there is no risk of a collision with a surrounding object, the technology controls the vehicle to move to the target lane.

The vehicle has to change the speed and the direction to move to the target lane. When the speed and the vehicles are changed, it is further influenced by inertia as the weight of the vehicle is large. Inertia is a property that keeps the initial motion state when an object does not receive force from the outside. For example, a dump truck that can carry luggage is influenced by inertial further than general passenger cars when changing lanes. While a vehicle moves to a target lane by changing the speed and the direction, a surrounding object may rapidly decelerate or change the direction. In this case, the risk that a dump truck collides with a surround object due to inertia increases.

There is a problem in the related art that when a vehicle change lanes, lane change is controlled without considering the weight of the vehicle, so the risk that vehicle turns over or falls down is high.

Even if there is no risk of collision of a vehicle with a surrounding object at present, there may be a risk of collision with the vehicle when an unexpected situation occurs, for example, a surrounding object rapidly changes lanes or the running speed. The related art cannot expect the situation in several second, so there is a problem that there is a risk of a collision of a vehicle with a surrounding object.

SUMMARY

According to at least one embodiment, the present disclosure provides an apparatus for controlling lane change, comprising a weight detection unit sensing weight of freight, a safety space setting unit receiving sensed weight and setting a safety space required for a vehicle to safely move to a target lane from a current lane based on the sensed weight, a sensor unit sensing whether an object exists in the safety space using at least one sensor, and a control unit controlling the vehicle to move to the target lane within a preset time when there is no sensed object.

According to at least another embodiment, the present disclosure provides a method of controlling lane change, comprising a process of sensing, by a weight detection unit, weight of freight, a process of receiving, by a safety space setting unit, sensed weight and setting, by the safety space setting unit, a safety space required for a vehicle to safely move to a target lane from a current lane based on the sensed weight, a process of sensing, by a sensor unit, whether an object exists in the safety space using at least one sensor, and a process of controlling, by a control unit, the vehicle to move to the target lane within a preset time when there is no sensed object.

REFERENCE NUMERALS

100: WEIGHT DETECTION UNIT
102: SAFETY SPACE SETTING UNIT
104: SENSOR UNIT
106: COLLISION RISK DETERMINATION UNIT
108: MACHINE LEARNING UNIT
110: SCC UNIT
112: CONTROL UNIT
114: ALARM UNIT

DETAILED DESCRIPTION

An apparatus for controlling lane change according to an embodiment can sense the weight of freight and can set a safety space for lane change on the basis of the sensed weight.

An apparatus for controlling lane change according to an embodiment can expect whether there is a risk of a collision within a predetermined time and can control a vehicle even if there is no risk of a collision of a vehicle with a surrounding object, using machine learning.

The issues to be solved by the present disclosure are not limited to those mentioned above, and other unmentioned issues to be resolved by the present disclosure will be clearly understood by those skilled in the art from the following description.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of related known components and functions when considered to obscure the subject of the present disclosure will be omitted for the purpose of clarity and for brevity.

In describing the components of the embodiments, alphanumeric codes may be used such as first, second, i), ii), a), b), etc., solely for the purpose of differentiating one component 5 from others but not to imply or suggest the substances, the order, or sequence of the components. Throughout this specification, when parts "include" or "comprise" a component, they are meant to further include other components, not to exclude thereof unless there is a particular description contrary thereto.

Figure 1:
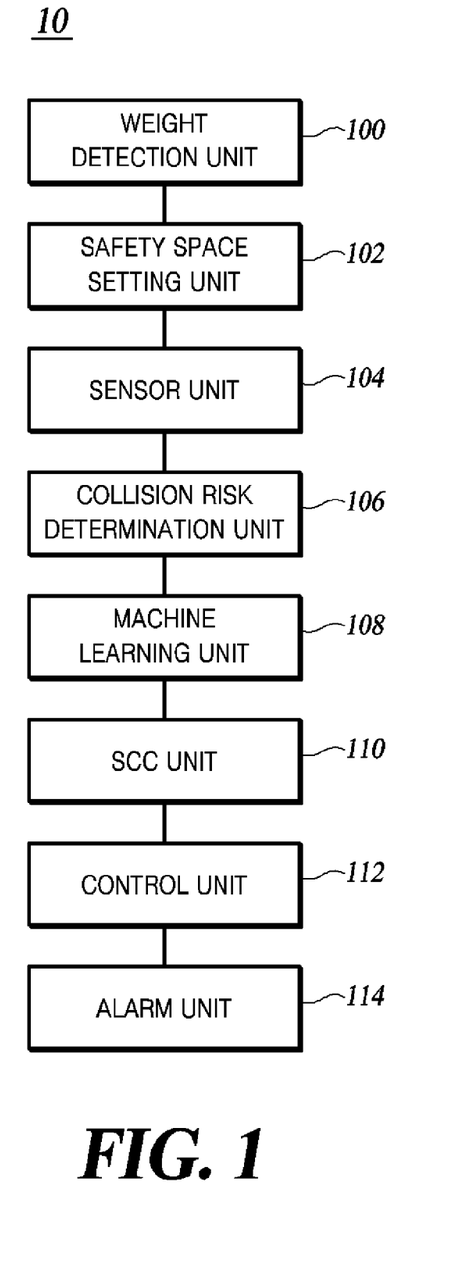
FIG. 1 is a configuration block diagram of an apparatus for controlling lane change according to at least one exemplary embodiment of the present disclosure.

FIG. 1 is a configuration block diagram of an apparatus for controlling lane change according to at least one exemplary embodiment of the present disclosure.

Referring to FIG. 1, the apparatus 10 for controlling lane change include all or some of a weight detection unit 100, a safety space setting unit 102, a sensor unit 104, a collision risk determination unit 106, a machine learning unit 108, an SCC unit 110, a control unit 112, and an alarm unit 114.

The weight detection unit 100 senses the weight of freight included in a cargo box. The cargo box is equipment in which freight is loaded, and the trunk of a passenger car and the freight compartment included in a dump truck are representative.

The safety space setting unit 102 receives sensed weight and sets a safety space on the basis of the sensed weight. The safety space means a space required for a vehicle to move to a target lane without colliding with surrounding objects. The safety space may be set in a plurality of steps in accordance with the weight of freight. For example, when the weight of freight exceeds 60% of the maximum weight (hereafter, a maximum weight limit) that a vehicle can carry, an area that is a product of five times the maximum length of a vehicle and the width of a lane may be set as a first safety space. When the weight of freight exceeds is 30% or more and less than 60% of the maximum weight limit, an area that is a product of four times the maximum length of a vehicle and the width of a lane may be set as a second safety space. When the weight of freight exceeds is less than 30% of the maximum weight limit, an area that is a product of three times the maximum length of a vehicle and the width of a lane may be set as a third safety space.

The sensor unit 103 receives a set safety space from the safety space setting unit 102. The sensor unit 104 senses whether surrounding objects exist in the set safety space using at least one sensor. The at least one or more sensors include a Radio Detection And Ranging (RADAR), a Light Detection And Ranging (LIDAR), a camera, etc. The radar senses surrounding objects electromagnetic waves that are transmitted and returned. The radar can sense surrounding objects existing ahead of and behind a vehicle.

The Lidar transmits a laser and can sense surrounding objects using reflected waves. The Lidar can sense surrounding objects existing at sides of a vehicle that are difficult to sense using a radar and a camera.

The sensor unit 104 generalizes data, which are collected using the radar, the Lidar, and the camera, using sensor fusion. The sensor fusion, which is a type of combining a plurality of sensors in one group, is a technology of generalizing data collected from each sensor.

The collision risk determination unit 106 determines whether there is a risk of a collision of a vehicle with surrounding objects. The collision risk determination unit 106 determines a collision risk by sensing the speed, the movement directions, etc. of surrounding objects and receiving the speed, the movement direction, etc. (hereafter, 'traveling information) of a vehicle.

The machine learning unit 108 can learn whether to perform control according to a driving habit of a driver and a driving environment. Machine learning is a computer algorithm that enables a computer learns through experiences. The machine learning unit 108 can estimate driving of surrounding objects on the basis of learned data. The machine learning unit 108 transmits data of estimating driving of surrounding objects to the collision risk determination unit 106. The collision risk determination unit 106 can determine a collision risk of a vehicle with surrounding objects in consideration of the estimated data.

For example, when a surrounding object is a passenger car, the passenger car may change the speed and the movement direction with a turn signal indicator turned on to change lanes. In this case, although a collision risk does not exist in the current driving situation, the machine learning unit 108 should determine a collision risk by estimating the position of the passenger car after N seconds after the passenger car turns on a turn signal indicator. The machine learning unit 108 can sense turning-on of turn signal indicators of the passenger car using at least one sensor.

For example, when it is determined that the passenger car is positioned in a safety space in seconds after the passenger car turns on a turn signal indicator, the machine leaning unit 108 can estimate that there is a collision risk. On the contrary, when it is determined that the passenger car is not positioned in a safety space in seconds after the passenger car turns on a turn signal indicator, the machine leaning unit 108 can estimate that there is no collision risk.

When an expected position of a surrounding object after N seconds is estimated, the machine learning unit 108 calculates an expected time-to-collision (TTC) between a vehicle and the surrounding vehicle on the basis of the expected position. The machine learning unit 108 transmits the calculated TTC to the collision risk determination unit 106.

The SCC unit 110 controls a vehicle to drive while keeping a predetermined distance from a forward vehicle. Smart Cruise Control (SCC) is a technology of controlling a vehicle to drive at a constant speed close to a preset driving speed in consideration of the distance from a forward vehicle. The SCC unit 110 can prevent an accident by preventing a vehicle from recklessly changing the speed and the direction to enter a target lane. Further, in order to prevent surrounding objects from being in a safety space, the SCC unit 110 can control a vehicle to adjust the distance between the vehicle and a forward vehicle.

When the collision risk determination unit 106 determines that there is no collision risk between a vehicle and surrounding objects, the control unit 112 controls the vehicle to move to a target lane. When the collision risk determination unit 106 determines that there is a collision risk between a vehicle and surrounding objects, the control unit 112 controls the vehicle to drive in the current lane.

The control unit 112 can control a vehicle by further considering a lane change time on the basis of a set safety space. For example, when the first safety space is set, the weight of freight exceeds 60% of the maximum weight limit, so it is possible to control a vehicle by setting the lane change time of the vehicle as 7 seconds. For example, when the second safety space is set, the weight of freight is 30% or more and less than 60% of the maximum weight limit, so it is possible to control a vehicle by setting the lane change time of the vehicle as 6 seconds. For example, when the third safety space is set, the weight of freight is less than 30% of the maximum weight limit, so it is possible to control a vehicle by setting the lane change time of the vehicle as 5 seconds.

When the collision risk determination unit 106 determines that there is no collision risk between a vehicle and surrounding objects, the alarm unit gives an alarm that lane change control is performed. When the collision risk determination unit 106 determines that there is a collision risk between a vehicle and surrounding objects, the alarm unit gives an alarm that lane change control is impossible.

As the type of giving an alarm of the alarm unit 114, there are a display, a haptic device, a sound system, etc. The type of using a display provides visual information to a driver or a passenger by generating visual output. The display mounted in a vehicle includes a Center Infotainment Display (CID), a cluster, a Rear Seat Entertainment (RSE), a Head Up Display (HUD), etc. The CID provides driving information of a vehicle and entertainment by communicating with a mobile and an audio system. A cluster provides information for driving such as the speed of a vehicle, an RPM, a fuel amount, a collision warning, etc. An RSE is a display that is usually used for entertainment for the passengers in the rear seats of a vehicle and provides also the driving state of a vehicle or brief navigation information. An HUD projects and provides a graphic image of the current speed, the remaining amount of fuel, navigation information, etc. of a vehicle on the windshield in front of a driver. However, the display is not limited thereto and may include devices that can provide a driver or passengers with visual information.

The haptic device provides information to a driver or a passenger by generating tactile output. The haptic device includes devices mounted or a car seat, a steering wheel, etc. However, the haptic device is not limited thereto and may include devices that a driver comes in contact with while driving a vehicle.

Figure 2:
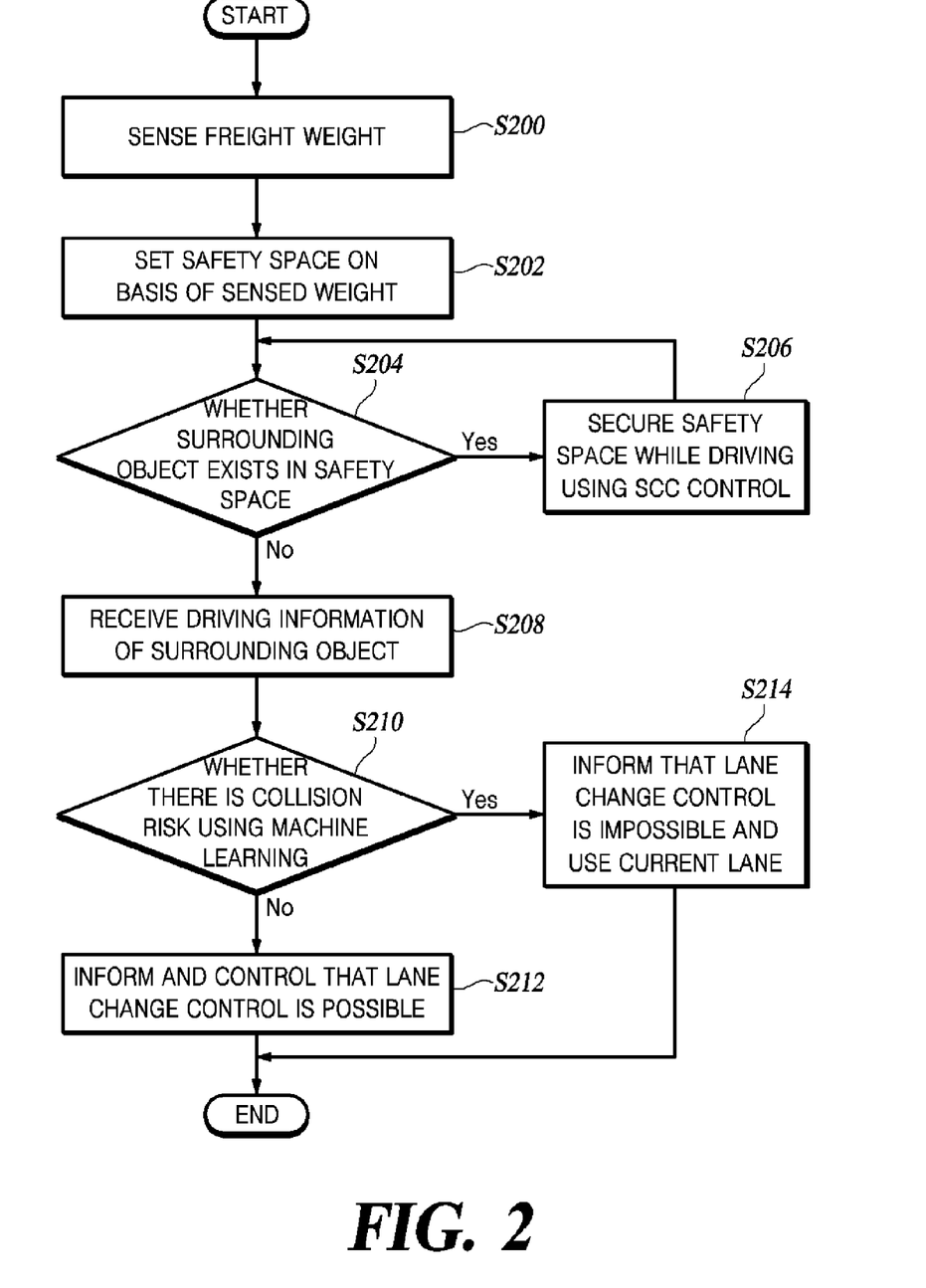
FIG. 2 is a flowchart of a method for controlling lane change according to at least one exemplary embodiment of the present disclosure.

FIG. 2 is a flowchart of a method for controlling lane change according to at least one exemplary embodiment of the present disclosure.

Referring to FIG. 1, when a vehicle starts to be driven, the weight detection unit 100 senses the weight of freight (S200).

The safety space setting unit 102 receives sensed weight and sets a safety space on the basis of the received weight.

The sensor unit 104 senses whether surrounding objects exist in the set safety space using at least one sensor.

When a surrounding object exists in the safety space, the SCC unit 110 controls a vehicle to drive while maintaining a predetermined distance from a forward vehicle. Further, the SCC unit 110 can control a predetermined distance between a vehicle and a forward vehicle to prevent a surrounding object from existing in the safety space. Accordingly, the SCC unit 110 can control a vehicle such that surrounding objects do not exist in a safety space (S206). When a surrounding object does not exist in a safety space as the result of control of the SCC unit 110, step S208 is performed, and a surrounding object exists in a safety space, step S206 is performed again.

When a surrounding object does not exist in a safety space, the collision risk determination unit 106 senses the speed, movement direction, etc. of surrounding objects (S208).

The collision risk determination unit 106 determines whether there is a risk of a collision of a vehicle with a surrounding object on the basis of the sensed information. When the collision risk determination unit 106 determines whether there is a risk of a collision of a vehicle with a forward vehicle, the collision risk determination unit 106 can determine a collision risk by receiving data that the machine learning unit 108 learned and further considering the received data (S210).

When there is no collision risk between a vehicle and a forward object as the result of determination of the collision risk determination unit 106, the control unit 112 controls the vehicle to move to a target lane. The alarm unit 114 informs a driver that lane change control is performed.

When there is a collision risk between a vehicle and a forward object as the result of determination of the collision risk determination unit 106, the control unit 112 controls the vehicle to drive in the current lane. The alarm unit 114 informs a driver that lane change control is impossible.

Figure 3:
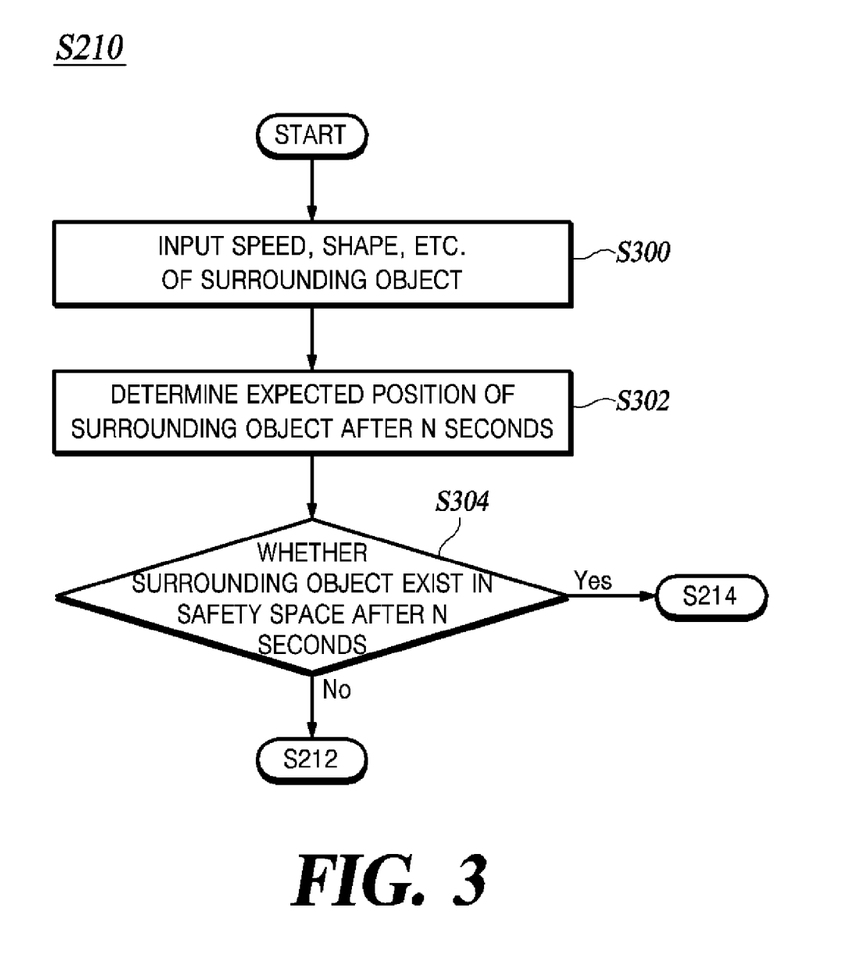
FIG. 3 is a flowchart of an algorithm that determines a collision risk using machine learning according to at least one exemplary embodiment of the preset disclosure.

FIG. 3 is a flowchart of an algorithm that determines a collision possibility using machine learning according to at least one exemplary embodiment of the present disclosure.

Referring to FIG. 3, the machine learning unit 108 senses the speed, size, shape, etc. of surrounding objects, and inputs the sensed data into an algorithm (S300).

The machine learning unit 108 estimates expected positions of the surrounding objects after N seconds (S302).

The machine learning unit 108 determines whether an expected position of a surrounding object is in a safety space after N seconds (S304). Step S212 is performed when it is determined that a surrounding object does not exist in the safety space after N second, and step S214 is performed again when a surrounding object exists in the safety space.

Figure 4:
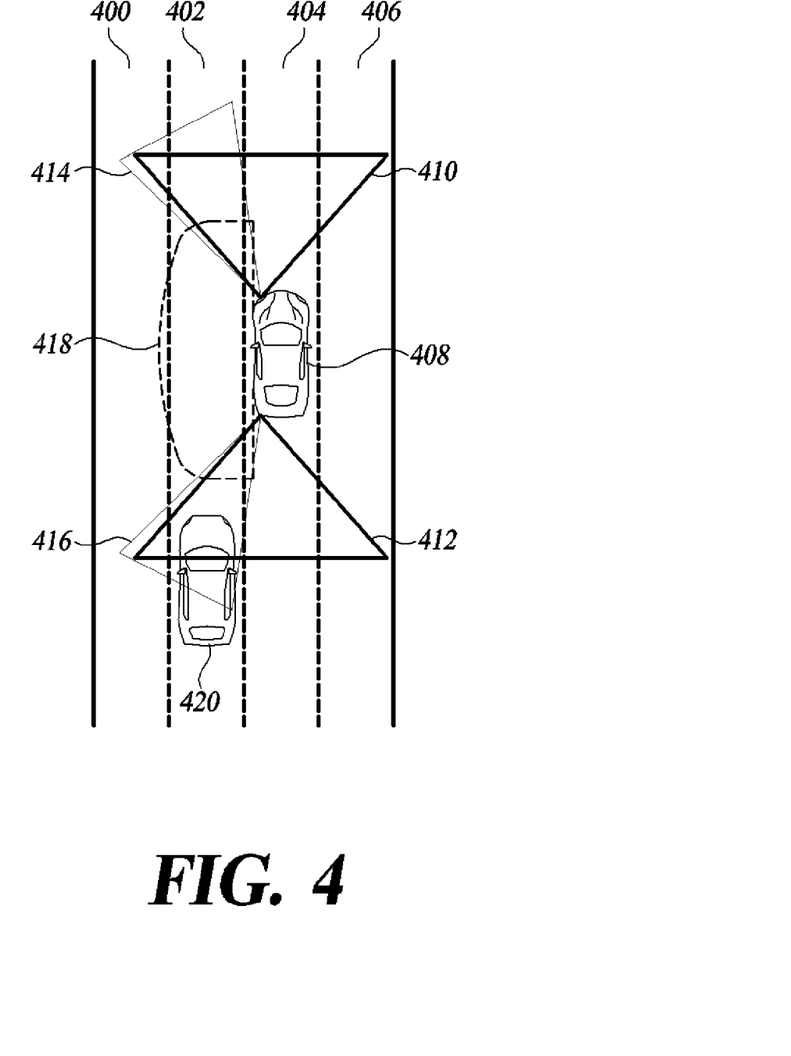
FIG. 4 is an exemplary diagram in which a vehicle senses surrounding objects using at least one sensor according to at least one exemplary embodiment of the present disclosure.

FIG. 4 is an exemplary view of sensing surrounding object by a vehicle according to an embodiment of the present disclosure using at least one sensor.

Referring to FIG. 4, it is an exemplary view in which a vehicle 408 is being driven in a third lane 404 and attempts to change lanes from the third lane 304 to a second lane 402. A front camera 410 and a front radar 414 sense surrounding objects 420 ahead of the vehicle in the second lane 402 and the third lane 404, and a rear camera 412 and a rear radar 416 sense surrounding objects 420 behind the vehicle in the second lane 402 and the third lane 404. A Lidar 418 senses a surrounding object at a side of the vehicle in the second lane 402.

Figure 5A:
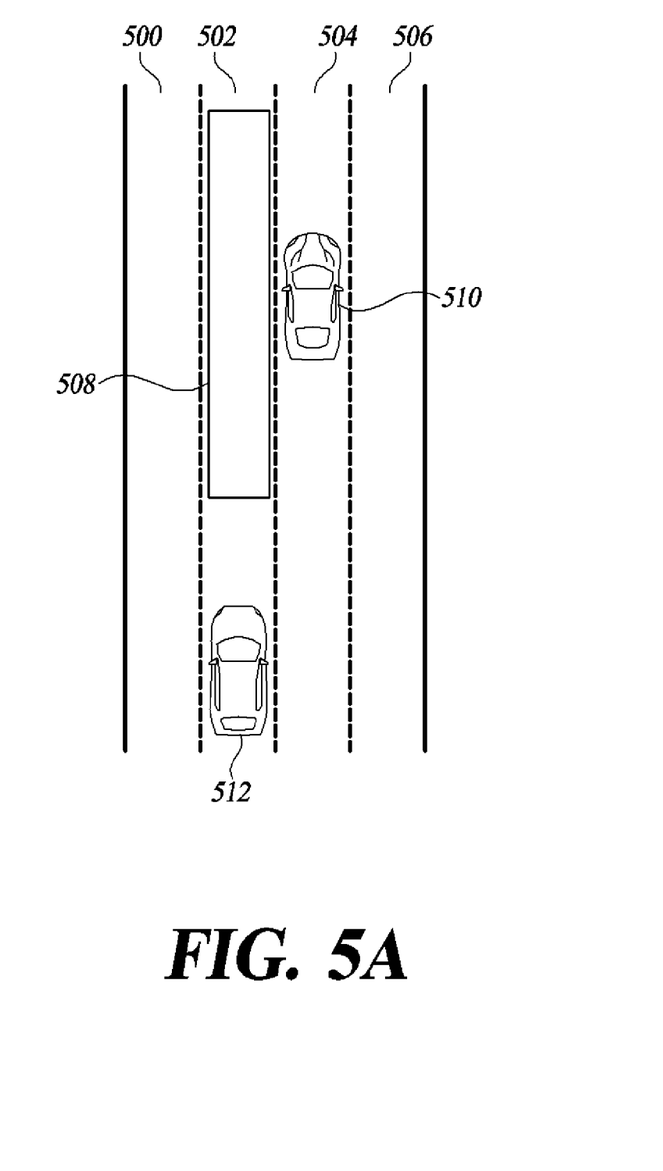
FIG. 5A and FIG. 5B are exemplary diagrams in which the apparatus for controlling lane change can control lane change according to at least one exemplary embodiment of the present disclosure.
Figure 5B:
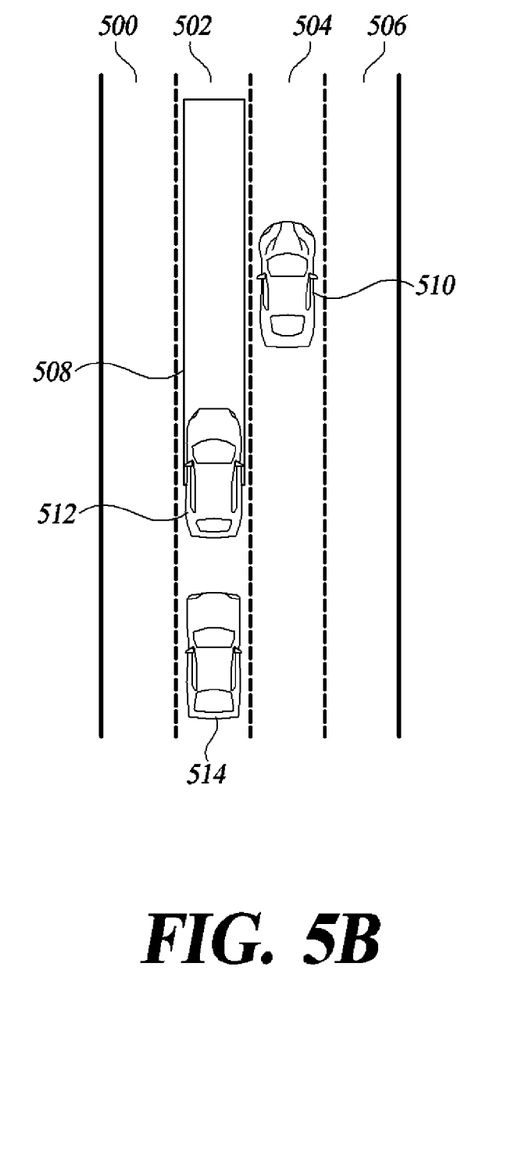

FIG. 5A and FIG. 5B are exemplary diagrams in which the apparatus for controlling lane change can control lane change according to at least one exemplary embodiment of the present disclosure.

Referring to FIG. 5A, it is an exemplary diagram in which the weight of freight corresponds to 30% of the maximum weight limit and the safety space setting unit 102 sets a third safety space 508 that is the product of three times the maximum length of a vehicle and the width of a lane. Since a surrounding object 512 does not exist in the third safety space 508 and there is no risk of a collision between a vehicle 510 and the surrounding object 512, the control unit 112 controls the vehicle 510 to move to the second lane 502.

Referring to FIG. 5B, a surrounding object 512 exists in the third safety space 508. However, an expected position 514 of the surrounding object after N seconds based on the data, which the machine learning unit 108 learned, does not exist in the third safety space 508, so the control unit 112 controls the vehicle 510 to move to the second lane 502.

Figure 6A:
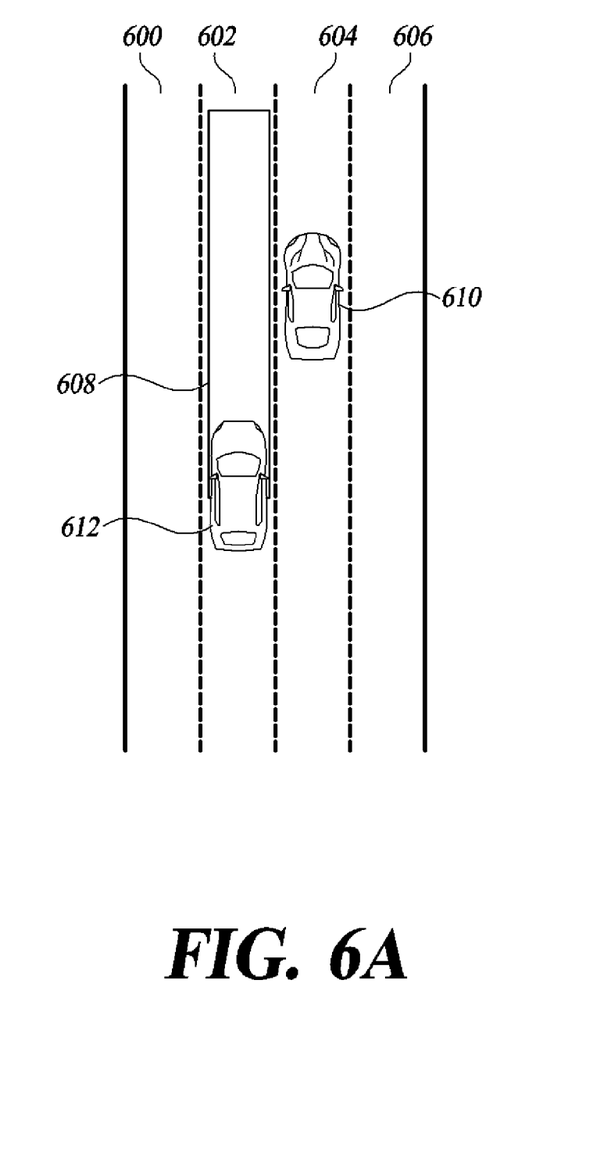
FIG. 6A and FIG. 6B are exemplary diagrams in which the apparatus for controlling lane change cannot control lane change according to at least one exemplary embodiment of the present disclosure.
Figure 6B:
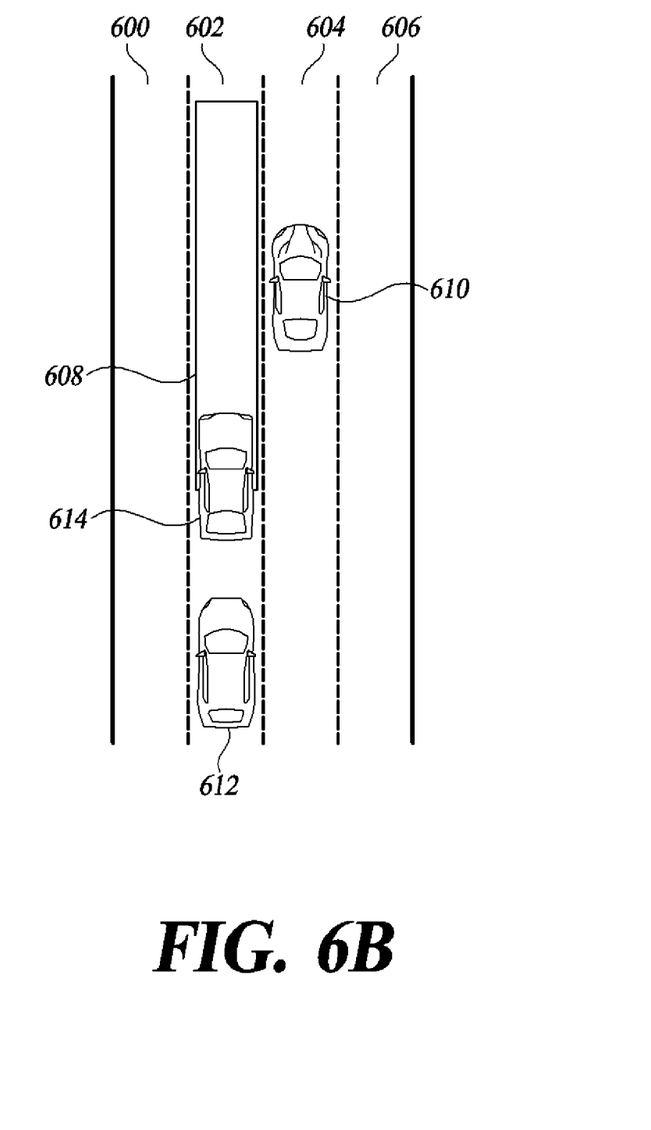

FIG. 6A and FIG. 6B are exemplary diagrams in which the apparatus for controlling lane change cannot control lane change according to at least one exemplary embodiment of the present disclosure.

Referring to FIG. 6A, a surrounding object 612 exists in the third safety space 608. In this case, the control unit 112 controls a vehicle 610 to keep driving in a third lane 604.

Referring to FIG. 6B, a surrounding object 612 does not exist in the third safety space 608. However, when it is determined that an expected position 614 of the surrounding object after N seconds based on the data, which the machine learning unit 108 learned, exists in the third safety space 608, the control unit 112 controls the vehicle 610 to keep driving in the third lane 604.

The flowcharts are described to sequentially perform the processes in the specification, but these are provided only to exemplarily describe the spirit of some embodiments of the present disclosure. In other words, the present disclosure may be changed and modified in various ways by those skilled in the art including some embodiments of the present disclosure by changing the processes described in the flowcharts of the present disclosure or performing one or more of the processes in parallel without departing from the fundamental characteristics of some embodiments of the present disclosure, so the flowcharts of the present disclosure are not limited to a time-series sequence.

Various embodiments of apparatuses, units, and methods described herein may be implemented by a programmable computer. The computer is a computer-programmable processor, a data storage system (including a volatile memory, a nonvolatile memory, or other types of storage systems, or a combination thereof), and at least one communication interface. For example, the programmable computer may be one of a server, a network device, a set-top box, a built-in device, a computer expansion module, a personal computer, a laptop, a Personal Data Assistant (PDA), a cloud computing system, or a mobile device.

According to an embodiment, the apparatus for controlling lane change can prevent risks such as turnover and falling-down of a vehicle even if a surrounding object rapidly changes driving by securing a safety space based on the weight of freight.

According to an embodiment, the apparatus for controlling lane change can expect whether a surrounding vehicle exists in a safety space within a preset time using machine learning. Accordingly, it is possible to prevent an accident of a collision between a vehicle and a forward object.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill would understand the scope of the claimed invention is not to be limited by the above explicitly described embodiments but by the claims and equivalents thereof

What is claimed is:

1. An apparatus for controlling lane change, the apparatus comprising:
    a weight detection unit sensing weight of freight;
    a safety space setting unit receiving sensed weight and setting a safety space required for a vehicle to safely move to a target lane from a current lane based on the sensed weight;
    a sensor unit sensing whether an object exists in the safety space using at least one sensor;
    a control unit controlling the vehicle to move to the target lane within a preset time when there is no sensed object; and
    a Smart Cruise Control (SCC) unit controlling the vehicle to drive while keeping a preset distance from a front vehicle,
    wherein the SCC unit controls the vehicle by further considering the sensed weight.

2. The apparatus of claim 1, further comprising a collision risk determination unit determining whether there is a collision risk between the sensed object and the vehicle based on at least one of a speed and a movement direction of the sensed object,
    wherein the control unit controls the vehicle by further considering whether there is the collision risk between the sensed object and the vehicle.

3. The apparatus of claim 2, wherein the collision risk determination unit receives driving information of the vehicle from the vehicle and determines the collision risk by further considering the driving information.

4. The apparatus of claim 2, further comprising a machine learning unit calculating an expected Time-To-Collision (TTC) for the sensed object by performing machine learning based on at least one of a size of the sensed object, a shape of the sensed object, the speed of the sensed object, and a distance between the vehicle and the sensed object,
    wherein the collision risk determination unit determines whether there is the collision risk between the sensed object and the vehicle by further considering the TTC.

5. The apparatus of claim 1, further comprising an alarm unit informing a driver that lane change control is started when the control unit controls the vehicle, and informing the driver that the lane change control is impossible when the lane change control is impossible.

6. A method of controlling lane change, the method comprising:
    a process of sensing, by a weight detection unit, weight of freight;
    a process of receiving, by a safety space setting unit, sensed weight and setting, by the safety space setting unit, a safety space required for a vehicle to safely move to a target lane from a current lane based on the sensed weight;
    a process of sensing, by a sensor unit, whether an object exists in the safety space using at least one sensor;
    a process of controlling, by a control unit, the vehicle to move to the target lane within a preset time when there is no sensed object; and
    a Smart Cruise Control (SCC) process of controlling, by a Smart Cruise Control unit, the vehicle to drive while keeping a preset distance from a front vehicle,
    wherein the SCC process further includes controlling, by the SCC unit, the vehicle by considering the sensed weight.

7. The method of claim 6, further comprising a collision risk determination process of determining, by a collision risk determination unit, whether there is a collision risk between the sensed object and the vehicle based on at least one of a speed and a movement direction of the sensed object, wherein the process of controlling the vehicle further includes considering, by the control unit, whether there is the collision risk between the object and the vehicle.

8. The method of claim 7, wherein the collision risk determination process further includes receiving, by the collision risk determination unit, driving information of the vehicle from the vehicle and determining, by the collision risk determination unit, the collision risk by considering the driving information.

9. The method of claim 7, further comprising a process of calculating, by a machine learning unit, an expected Time-To-Collision (TTC) for the object by performing machine learning based on at least one of a size of the sensed object, a shape of the sensed object, the speed of the sensed object, and a distance between the vehicle and the sensed object,
wherein the collision risk determination process further includes determining, by the collision risk determination unit, whether there is the collision risk between the sensed object and the vehicle by further considering the TTC.

10. The method of claim 6, further comprising a process of informing, by an alarm unit, a driver that lane change control is started when the vehicle is controlled by the control unit, and informing the driver that the lane change control is impossible when the lane change control is impossible.

* * * * *